US006972878B2

(12) United States Patent
Shyu

(10) Patent No.: US 6,972,878 B2
(45) Date of Patent: Dec. 6, 2005

(54) SCANNER CAPABLE OF ADJUSTING THE HEIGHT OF A PAPER COVER

(76) Inventor: Devon Shyu, 317, Zhong-Zheng Rd., Gui-Ren Hsiang, Tainan Hsien (TW)

( * ) Notice: Subject to any disclaimer, the term of this patent is extended or adjusted under 35 U.S.C. 154(b) by 647 days.

(21) Appl. No.: 09/842,392

(22) Filed: Apr. 26, 2001

(65) Prior Publication Data

US 2002/0118404 A1 Aug. 29, 2002

(30) Foreign Application Priority Data

Feb. 23, 2001 (TW) .............................. 90202750 U

(51) Int. Cl.$^7$ ............................................. H04N 1/04
(52) U.S. Cl. ...................... 358/497; 358/494; 399/380; 16/239
(58) Field of Search ................................ 358/498, 497, 358/474; 16/272, 254, 239; 399/380; 355/25; 346/139; 347/223

(56) References Cited

U.S. PATENT DOCUMENTS

| 5,812,285 | A  | * | 9/1998 | Lin et al. .................... 358/497 |
| 6,163,927 | A  | * | 12/2000 | Leu ............................. 16/272 |
| 6,351,624 | B1 | * | 2/2002 | Hiruta ........................ 399/380 |
| 6,363,576 | B1 | * | 4/2002 | Hsu et al. .................... 16/239 |

* cited by examiner

Primary Examiner—Edward Coles
Assistant Examiner—Heather D. Gibbs
(74) Attorney, Agent, or Firm—Charles E. Baxley

(57) ABSTRACT

The present invention provides a scanner including a housing defining two mounting holes. An elastic rib is located beside each of the two mounting holes to provide a retaining action. A paper cover is pivotally mounted on the housing and has two locking hooks. Each locking hook is mounted in a respective mounting hole of the housing. Thus, the height of the paper cover can be adjusted according to the variation of depth of the locking hook in the mounting hole. In addition, the locking hook is retained by the elastic rib and the catch plate of the mounting hole, such that the paper cover cannot be removed easily, thereby preventing the paper cover from being lost.

7 Claims, 8 Drawing Sheets

SCANNER CAPABLE OF ADJUSTING THE HEIGHT OF A PAPER COVER

BACKGROUND OF THE INVENTION

1. Field of the Invention

The present invention relates to a scanner capable of adjusting the height of a paper cover, and more particularly to a scanner that can adjust the height of the paper cover automatically according to the thickness of papers to be scanned, and can prevent the paper cover from being detached and lost.

2. Description of the Related Art

In general, a scanner includes a housing pivoted with a pivotable cover to cover the papers to be scanned during the scanning process. However, the cover is pivoted in a fixed manner. Therefore, if the papers to be scanned have a greater thickness, or when the book is scanned, the cover cannot smoothly cover the object to be scanned.

The closest prior art of which the applicant is aware is disclosed in U.S. Pat. No. 5,812,285 which discloses a scanner capable of adjusting the height of a paper cover automatically. The paper cover is mounted with a horizontal shaft, and the body of the scanner defines a shaft cavity receiving the horizontal shaft. Thus, when the paper cover is used to cover the papers to be scanned having a greater thickness, the height of the paper cover can be adjusted such that the paper cover can smoothly cover the papers.

However, there is no proper retaining design between the horizontal shaft and the shaft cavity. Thus, although the horizontal shaft can be assembled in the shaft cavity easily, the horizontal shaft can also be detached from the shaft cavity easily, so that the paper cover is easily lost. In addition, two opposite support arms are mounted between the horizontal shaft and the paper cover. Each of the support arms has a plate shape, so that the structural strength thereof is not sufficient. Thus, when the user open the paper cover very quickly or open the paper cover with an excessively large force, the support arm is easily broken, thereby affecting the quality of the product.

SUMMARY OF THE INVENTION

The primary objective of the present invention is to provide a scanner, wherein when the paper cover is assembled with the housing of the scanner, the paper cover is retained by a retaining element, thereby preventing the paper cover from detaching from the housing of the scanner.

For achieving the above-mentioned objective, the paper cover is protruded with two locking hooks, and the housing of the scanner defines two mounting holes. An elastic rib is located beside each of the two mounting holes to provide a retaining action. Thus, each of the locking hooks is mounted in a respective mounting hole, and is prevented from detachment by the elastic rib.

The locking hook includes a shank having two sides each protruded with a wing block, thereby forming a substantially I-shaped structure which has an enhanced structural strength. Thus, when the paper cover is pivoted and opened with an excessive angle, the locking hook cannot be broken easily.

Further benefits and advantages of the present invention will become apparent after a careful reading of the detailed description with appropriate reference to the accompanying drawings.

DETAILED DESCRIPTION OF THE INVENTION

Figure 1:
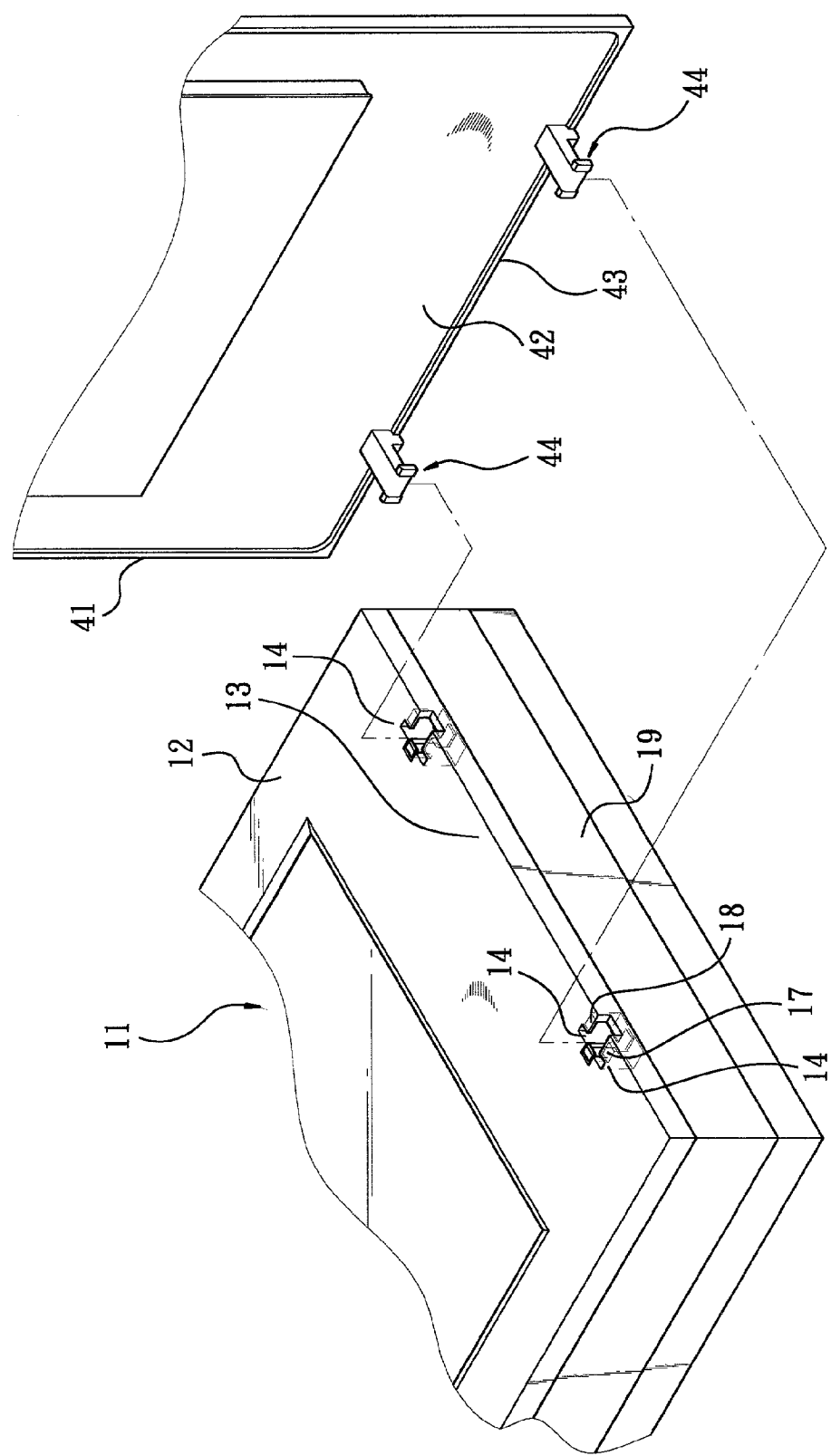
FIG. 1 is an exploded perspective view of a scanner capable of adjusting the height of a paper cover in accordance with the present invention.
Figure 2:
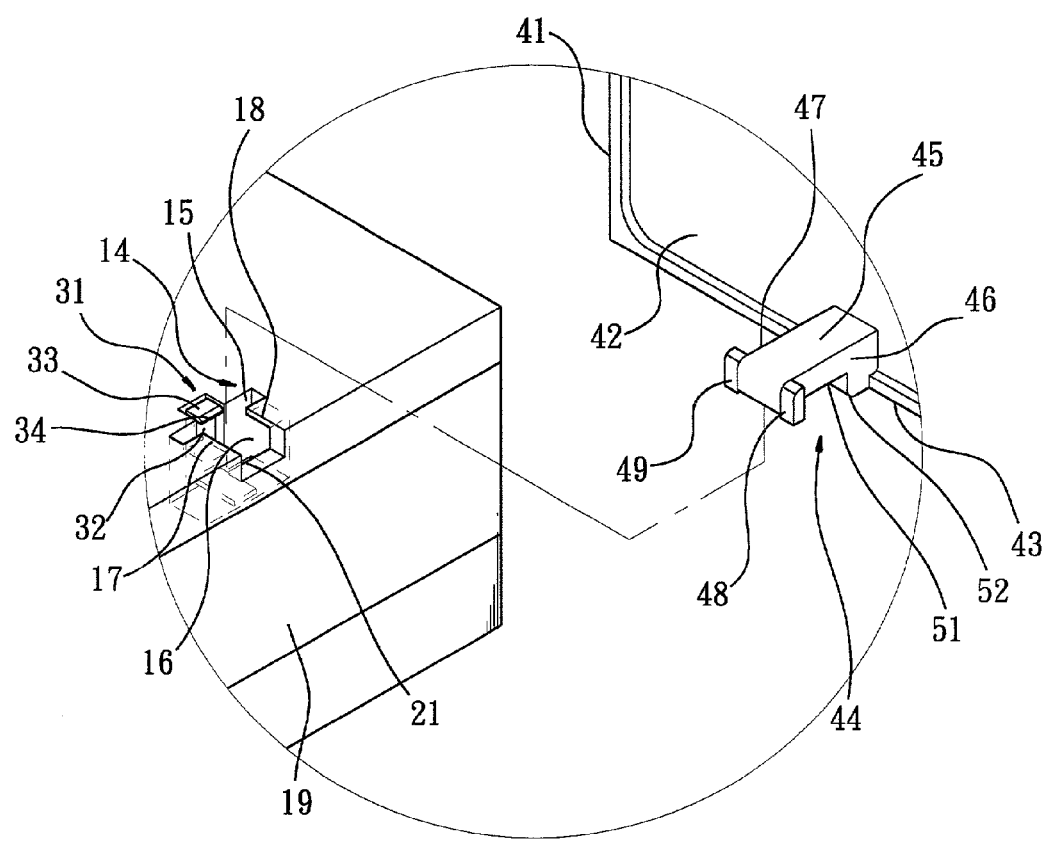
FIG. 2 is a locally enlarged view of the scanner capable of adjusting the height of a paper cover as shown in FIG. 1.

Referring to the drawings and initially to FIGS. 1 and 2, a scanner in accordance with the present invention comprises a housing 11 having an upper surface 12 having one end 13 defining two mounting holes 14. The top edge of each of the two mounting holes 14 is mounted with two opposite catch plates 17 and 18 located adjacent to the end face 19 of the housing 11 of the scanner. Thus, the mounting hole 14 is substantially T-shaped.

Figure 8:
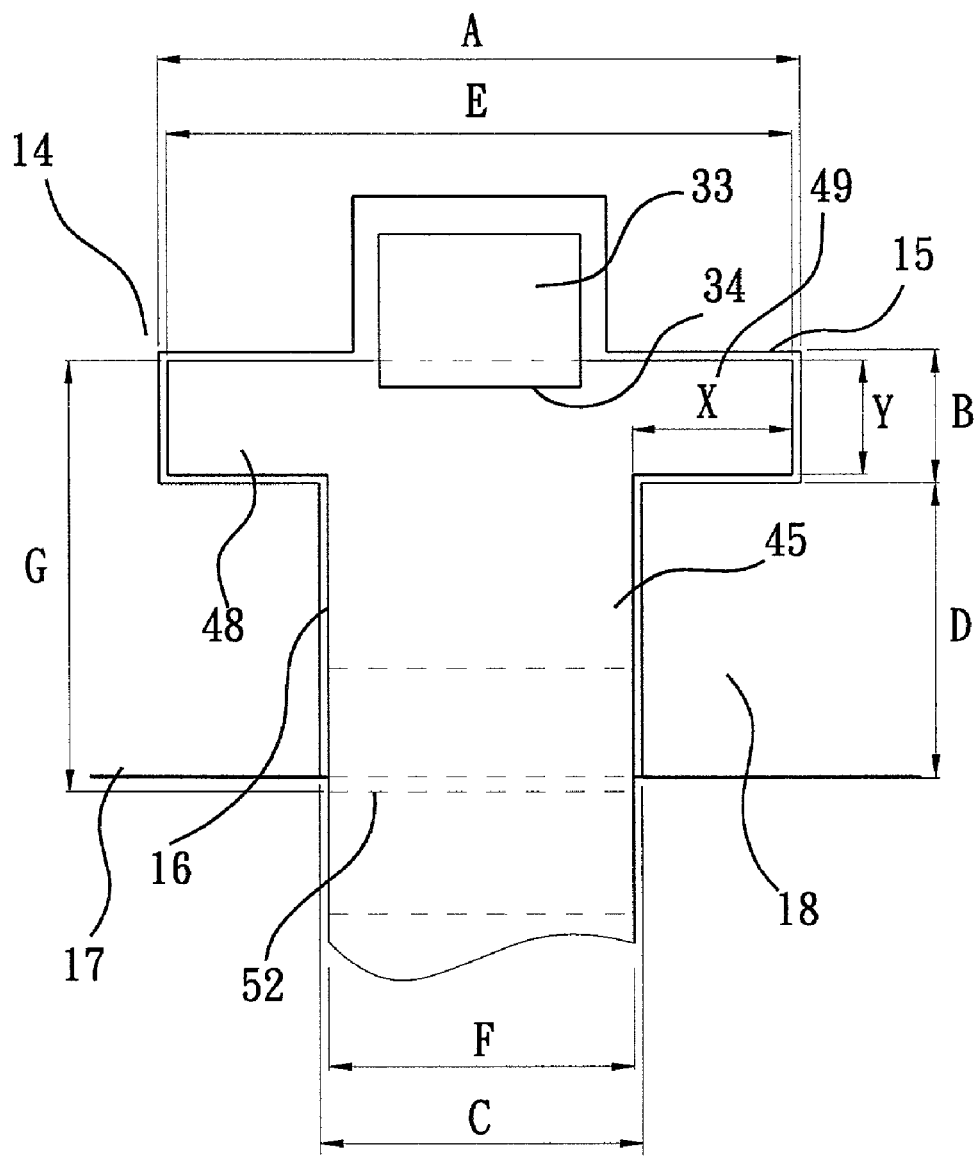
FIG. 8 is an assembled schematic view of the mounting hole and the locking hook of the scanner in accordance with the present invention.

Referring to FIGS. 2 and 8, the transverse width of the transverse portion 15 of the mounting hole 14 is defined as A, and the longitudinal length of the transverse portion 15 of the mounting hole 14 is defined as B. The longitudinal portion 16 formed by the distance between the two opposite catch plates 17 and 18 has a transverse width defined as C, and a longitudinal length defined as D. The transverse width C of the longitudinal portion 16 is smaller than the transverse width A of the transverse portion 15 apparently.

In addition, an open-shaped opening 21 is formed on the end face 19 of the housing 11 of the scanner and is connected with the mounting hole 14. The transverse width of the opening 21 is equal to the distance between the two opposite catch plates 17 and 18.

The elastic rib 31 consists of a rib body 32 whose top end is formed with a catch block 33. The elastic rib 31 that has an elastic movement ability is mounted on one side of the transverse portion 15 of each of the two mounting holes 14. The catch block 33 has one side 34 extended into the transverse portion 15 of the mounting hole 14.

Referring to FIGS. 1 and 2, two locking hooks 44 are mounted on the inner face 42 of the paper cover 41 located adjacent to the end portion 43. Each of the locking hooks 44 includes a shank 45 having a first side 46 protruded with a wing block 48, and a second side 47 protruded with a wing block 49, thereby forming an I-shaped structure. The surface of the shank 45 defines an opening 51.

Referring to FIGS. 2 and 8, the transverse distance between the two wing blocks 48 and 49 is defined as E which is slightly smaller than the transverse width A of the transverse portion 15 of the mounting hole 14. Each of the two wing blocks 48 and 49 has a length (transverse direction) defined as X, and a width (longitudinal direction) defined as Y. X may be equal to Y The width Y is slightly smaller than the longitudinal length B of the transverse portion 15 of the mounting hole 14.

In addition, the width of the shank 45 is defined as F. The width F is slightly smaller than transverse width C of the longitudinal portion 16 of the mounting hole 14. The length between each of the two wing blocks 48 and 49 and the end edge 52 of the opening 51 is defined as G. The length G is approximately equal to the sum of the longitudinal length B of the transverse portion 15 of the mounting hole 14 and the longitudinal length D of the longitudinal portion 16. Namely, G=B+D.

Figure 3:
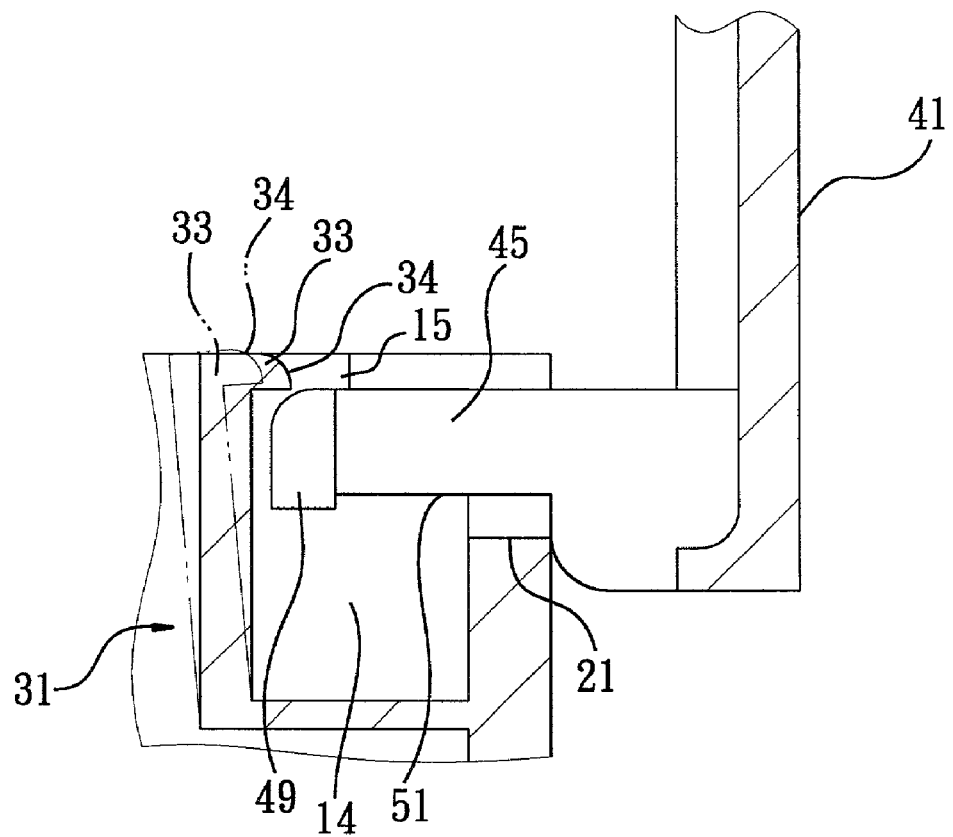
FIG. 3 is a side plan cross-sectional assembly view of the scanner capable of adjusting the height of a paper cover as shown in FIG. 2.

Referring to FIGS. 1, 3 and 8, when the paper cover 41 is assembled, the paper cover 41 is initially disposed in an upright manner, so that the locking hook 44 is disposed in a horizontal manner to align with the mounting hole 14. Because the transverse distance E between the two wing blocks 48 and 49 is slightly smaller than the transverse width A of the transverse portion 15 of the mounting hole 14, the locking hook 44 can enter the mounting hole 14 through the transverse portion 15 of the mounting hole 14.

When the locking hook 44 enters the mounting hole 14, one end of the shank 45 of the hook 44 will push the catch block 33 extended into the transverse portion 15, with assistance of a tool if necessary, to swing the elastic rib 31 so that the side 34 of the catch block 33 leaves the transverse portion 15. Thus, the shank 45 and the wing block 49 (the other wing block is not shown in the figure) completely and fluently enter the mounting hole 14. The opening 51 of the shank 45 faces the opening 21 of the housing 11 of the scanner. When the elastic rib 31 returns to its original position, the catch block 33 is located above the shank 45. Thus, if the user wants to remove the paper cover 41, he has to exert an external force to push the elastic rib 31 with assistance of a tool if necessary, so as to detach the catch block 33 from the transverse portion 15 of the mounting hole 14. Thus, the paper cover 41 cannot be removed easily, thereby preventing the paper cover 41 from being lost.

If the paper cover 41 is displaced outward, the shank 45 of the locking hook 44 is not located under the catch block 33 of the elastic rib 31. Because the width Y of each of the two wing blocks 48 and 49 is slightly smaller than the longitudinal length B of the transverse portion 15 of the mounting hole 14, the locking hook 44 is limited by the catch plates 17 and 18. Thus, the paper cover 41 cannot be moved upward to be removed, thereby efficiently preventing the paper cover 41 from detachment.

Figure 4:
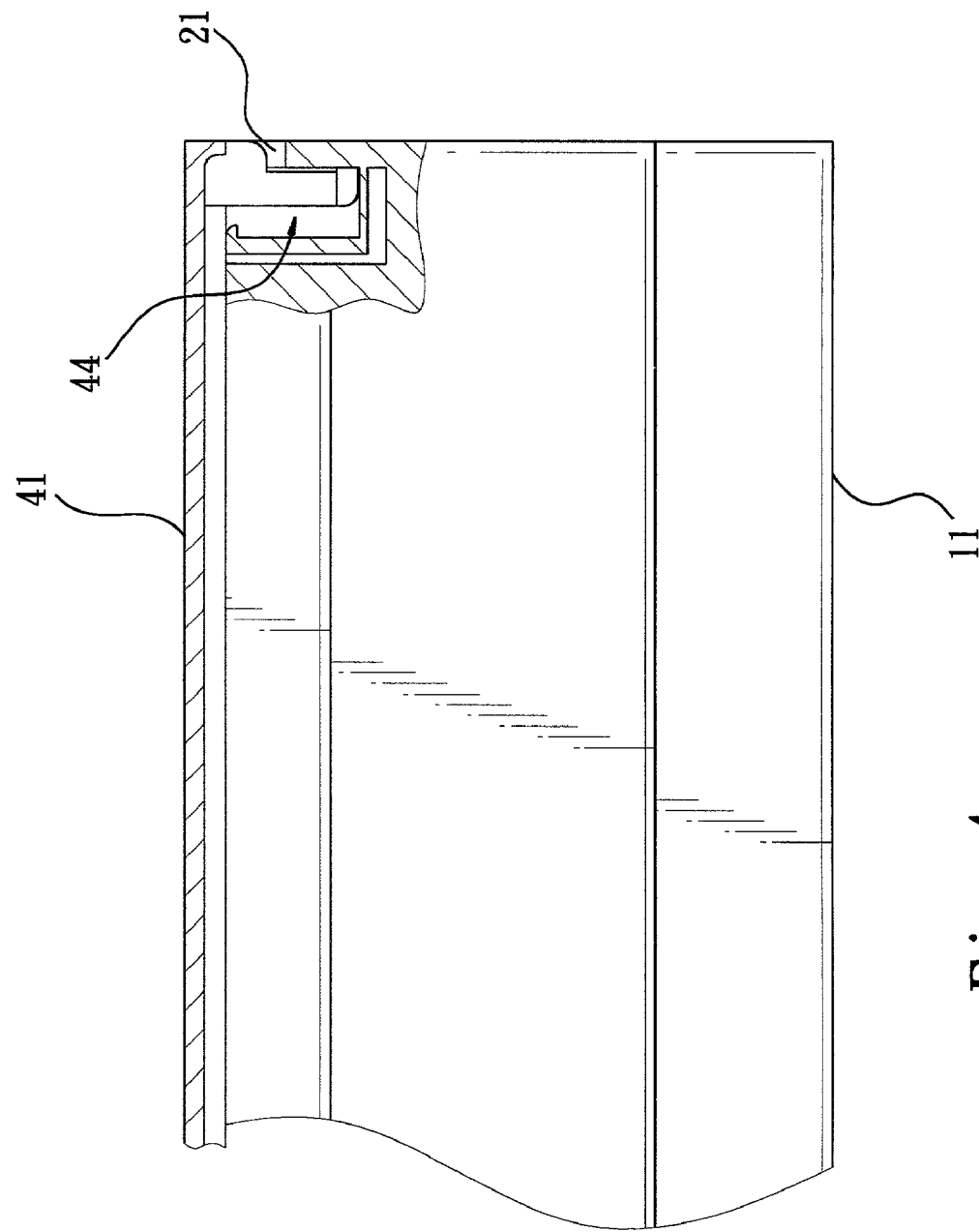
FIG. 4 is a schematic assembly view, wherein the paper cover in accordance with the present invention is disposed at a covering state.

Referring to FIG. 4, the paper cover 41 that has been assembled on the housing 11 of the scanner can be rotated, so that the locking hook 44 is disposed in a vertical manner. Thus, the paper cover 41 can cover the housing 11 of the scanner.

Figure 5:
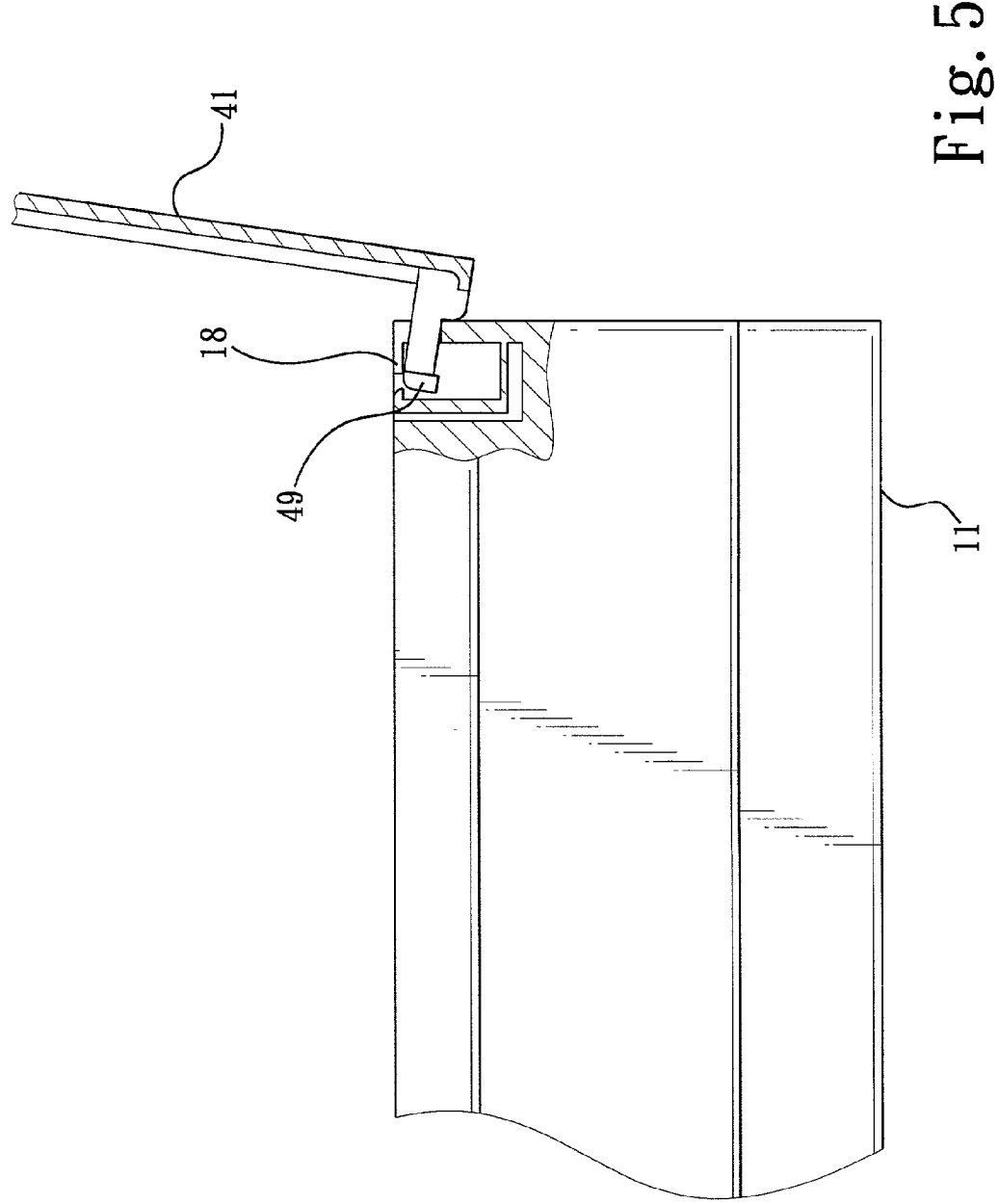
FIG. 5 is a schematic operational view of the scanner as shown in FIG. 4, wherein the paper cover is disposed at an opened state.

Referring to FIG. 5, when the paper cover 41 is pivoted outward, one end edge 52 of the opening 51 of the shank 45 is rested on the end face 19 of the housing 11 of the scanner, so that the shank 45 is disposed in an oblique manner. The length G between the wing block 49 and the end edge 52 of the opening 51 is approximately equal to the sum of the longitudinal length B of the transverse portion 15 of the mounting hole 14 and the longitudinal length D of the longitudinal portion 16, namely, G=B+D. Therefore, after the locking hook 44 is rotated, the wing block 49 (the other wing block is not shown in the figure) is displaced in a curved manner to abut the bottom edge of the catch plate 18, so that the paper cover 41 will not fall outward.

In the locking hook 44 of the paper cover 41, the shank 45 and the wing blocks 48 and 49 form a substantially I-shaped structure which has a greater structural strength. Thus, when the paper cover 41 is pivoted and opened, the locking hook 44 cannot be broken easily.

Figure 6:
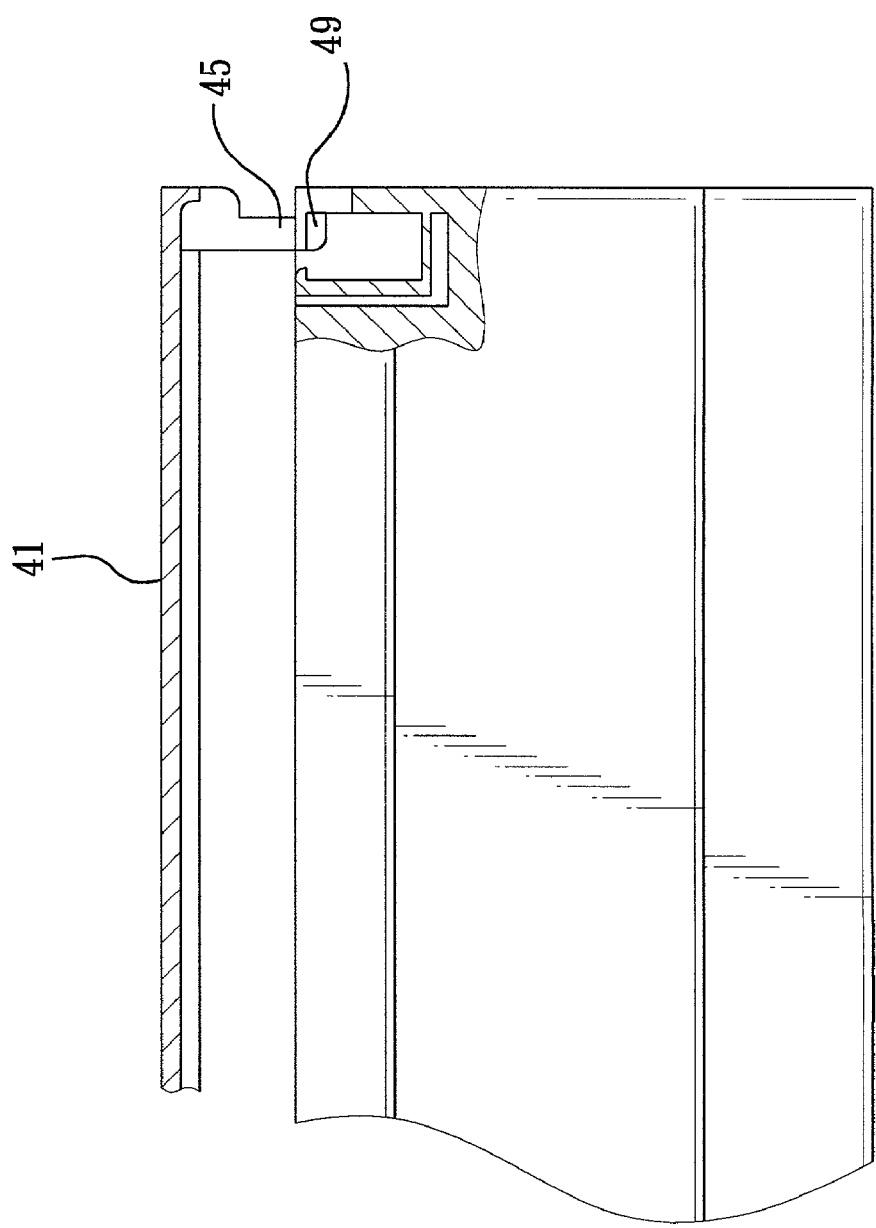
FIG. 6 is a schematic operational view of the scanner as shown in FIG. 4, wherein the paper cover is disposed at a lifted state.
Figure 7:
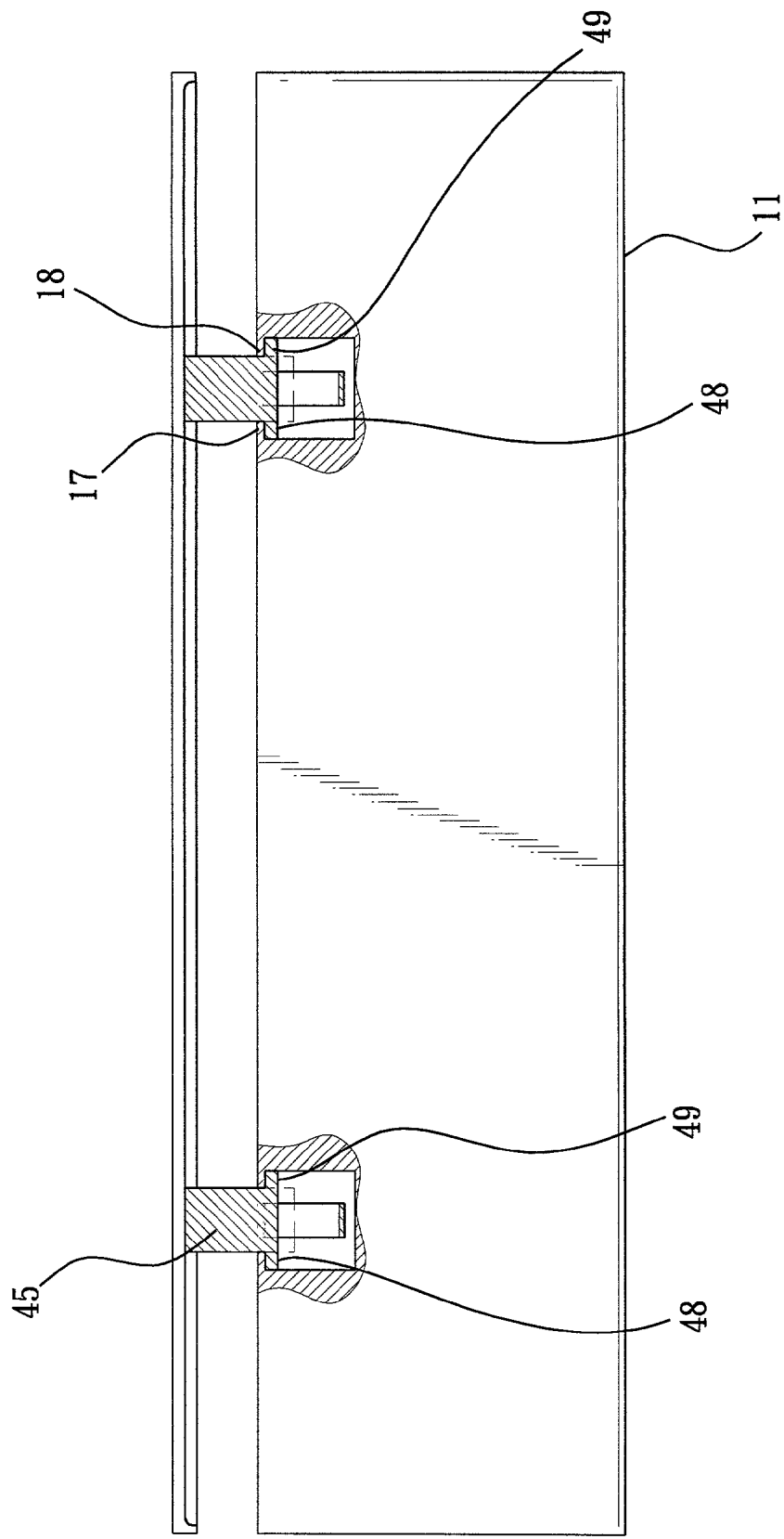
FIG. 7 is a schematic operational view of the scanner from another direction as shown in FIG. 4, wherein the paper cover is disposed at a lifted state.

Referring to FIGS. 6 and 7, the paper cover 41 located at a horizontal state is displaced upward. The wing blocks 48 and 49 at the two sides of the shank 45 are respectively rested on the bottom face of the catch plates 17 and 18. Thus, the paper cover 41 not only can adjust the covering height and horizontal degree according to the thickness of the papers to be scanned, but also will not detach from the housing 11 of the scanner due to displacement of the paper cover 41.

It is found from the above-mentioned description that, the present invention can adjust the height of the paper cover 41, prevent the locking hook 44 on the paper cover 41 from being broken, and can prevent the paper cover 41 from being detached and lost.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A scanner capable of adjusting the height of a paper cover, comprising:
   a housing having a first surface defining at least two mounting holes, each of the two mounting holes being formed with two opposite catch plates;
   a paper cover having an inner face with at least two locking hooks protruding outward therefrom, each locking hook including a shank having a first side and a second side each having a wing block protruded outward therefrom, each locking hook being mounted in a respective mounting hole of the housing, each wing block facing the respective catch plate; and
   at least two elastic ribs each mounted beside a respective mounting hole of the housing and each having a top end formed with a catch block, the catch block of each of the elastic ribs having one side extended into the respective mounting hole and rested on the respective locking hook to provide an elastic stop effect to the respective locking hook to prevent the respective locking hook from being detached from the respective mounting hole when the locking hook of the paper cover is both perpendicular to and parallel with the respective mounting hole of the housing.

2. The scanner capable of adjusting the height of a paper cover in accordance with claim 1, wherein the housing has a second surface located perpendicular to the first surface and formed with at least two open-shaped openings each connected to a respective one of the two mounting holes.

3. The scanner capable of adjusting the height of a paper cover in accordance with claim 1, wherein the shank of each locking hook has a surface formed with an opening.

4. The scanner capable of adjusting the height of a paper cover in accordance with claim 1, wherein each wing block has a length and a width equal to each other.

5. The scanner capable of adjusting the height of a paper cover in accordance with claim 2, wherein each of the mounting holes of the housing has a longitudinal portion connected to the open-shaped opening and a transverse portion traversing the longitudinal portion.

6. The scanner capable of adjusting the height of a paper cover in accordance with claim 5, wherein the one side of the catch block of each of the elastic ribs is extended into the transverse portion of the respective mounting hole.

7. The scanner capable of adjusting the height of a paper cover in accordance with claim 1, wherein the one side of the catch block of each of the elastic ribs is pushed by the respective locking hook to retract from the respective mounting hole when the respective locking hook is inserted into the respective mounting hole of the housing and is extended into the respective mounting hole by an elastic action after the respective locking hook is inserted into the respective mounting hole of the housing to stop movement of the respective locking hook.

* * * * *